United States Patent Office 3,726,709
Patented Apr. 10, 1973

3,726,709
METHOD FOR THE MANUFACTURE OF CELLULOSE-CONTAINING MATERIAL WITH IMPROVED ABRASION RESISTANCE
Peter Garth Garratt, Wallisellen, Jürg Hoigne, Zurich, and Jacques G. Heetman, Klingnau, Switzerland, assignors to Lonza Ltd., Gampel/Valais, Switzerland
No Drawing. Filed June 2, 1970, Ser. No. 42,906
Claims priority, application Switzerland, June 4, 1969, 8,475/69
Int. Cl. B44d 1/28, 1/50
U.S. Cl. 117—93.31                               10 Claims

ABSTRACT OF THE DISCLOSURE

Method of improving abrasion resistance and resistance to water absorption of wood and other cellulose containing materials in which the wood is impregnated with a polymerizable mixture containing vinyl acetate or propionate together with a highly branched monomer of a vinyl ester of a carboxylic acid containing seven to thirteen carbon atoms and the mixture polymerized.

BACKGROUND OF INVENTION

It is known to improve the properties of wood by impregnating it with methyl methacrylate or with mixtures of styrene and acrylonitrile and to form polymers in the wood. The disadvantage of this process is that if polymerization is effected utilizing high energy radiation, for example an eelctron beam or gama rays, a large dose of absorbed radiation is required. This materially increases the cost of the process.

A process has now been discovered whereby the properties of cellulose containing materials, particularly wood and paper, can be improved while avoiding the disadvantages of the known method.

THE INVENTION

It has now been discovered that the properties of cellulose containing materials such as wood and paper, particularly their abrasion resistance and resistance to absorption of water, can be improved by impregnating the cellulose containing starting material with a polymerizable mixture comprising low molecular weight vinyl ester of at least one carboxylic acid containing two to three carbon atoms together with at least one vinyl ester of a highly branched carboxylic acid and thereafter polymerizing the mixture.

The cellulose containing material may be any of a variety of such known materials, especially paper or wood, whether in the form of small pieces of wood, wooden plates, veneer or other wood forms.

Suitable low molecular weight vinyl monomers include vinyl acetate and propionate. Vinyl acetate is preferred because it is readily available. The highly branched vinyl esters include, for example, esters containing from about seven to thirteen carbon atoms. They may be represented by the formula

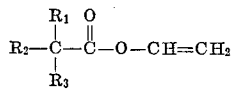

in which $R_1$, $R_2$ and $R_3$, which may be the same or different, are preferably straight chain alkyl groups selected so that the total number of carbon atoms is from about 7 to 13. It is preferable that one of the constituents be a methyl group. While pure compounds can be effectively employed, in the usual practice of the invention it is preferred to use the commercially available mixtures of monomers such as VeoVa 911 available from the Shell Chemical Company.

A particular advantage of the utilization of polymers prepared from such highly branched monomers is that the polymers are resistant to saponification due to the steric hindrance caused by the presence of the branched chains.

The amount of branched vinyl esters in the monomer mixture may vary over a wide range. Typically, the polymerization mixture will contain from about 5% to 50% of the branched ester, preferably 15% to 35%, based on the total weight.

It is often advantageous to add a small amount of cross linking agent, e.g. about 0.5% to 5%, to the monomer mixture. Typical cross linking agents include divinyl benzene and methylene bis acrylamide.

The addition of about 2% to 3% of a highly polar unsaturated monomer such as maleic acid, maleic anhydride acrylic acid, and the like, will often improve the properties of the final product.

Polymerization can be effected in the usual way by heat and catalysis with free radical initiators such as organic peroxides especially benzoyl peroxide. It is preferably effected, however, using high energy radiation such as X-rays, gamma rays or electron beams. Surprisingly, smaller doses of such high energy radiation is required to polymerize the monomer mixtures of this invention than are required for radiation polymerization of methyl methacrylate or of the styrene-acrylonitrile mixtures usually employed.

If the intensity of the radiation is increased a higher total dosage is required for polymerization.

This is a particular advantage of the compositions of this invention. According to known methods it is not possible to operate at high radiation intensity since the large dosages required cause decomposition of the wood or other cellulose containing material. In the present case, however, the required radiation dose is still low enough so that high intensity radiation can be employed. For example, a radiation dose of 15 megarads will polymerize only 15% of the methyl methacrylate impregnated in the wood. However, in a mixture according to this invention containing 50% vinyl acetate and 50% highly branched monomer, 95% of the material is polymerized at a medium radiation intensity of 3 megarads per second.

The table below records the radiation dosages required for polymerization of a polymerizable mixture of this invention compared with those of the prior art.

TABLE I

| Monomer or monomer mixture: | Radiation dose in megarads |
|---|---|
| 85:15 vinyl Acetate:VeoVa 911 | 1.0 |
| Methyl methacrylate | 2.25 |
| 60:40 styrene acrylonitrile | 6.5 |

It is advantageous to remove the sap from wood or to dry the starting materials. This may be done by the use of vacuum, with or without the application of heat. The material is then impregnated, respectively saturated, with the monomer mixture and this is advantageously done under pressure. The mixture is finally polymerized. It is, of course, permissible, to add to the cellulose containing materials plasticizers, dyes, flame-proofing materials or other generally employed additives together with the mixture of monomers.

The radiation dose required for the polymerization of the vinyl monomers can be further reduced by adding certain suitable solvents. Under certain circumstances it is advantageous to add to the mixture of monomers from about 1% to 20% by weight of a solvent such as carbon tetrachloride, chloroform, methanol.

Products made in accordance with the method of the invention have improved characteristics compared to the untreated raw materials. These characteristics are, in general, comparable to those of products impregnated with poly methyl methacrylate. Compared to the latter, however, the products made with the method of the invention have the added advantage of increased abrasion resistance.

The examples below will explain the invention, without limiting it.

Example 1

Okoume-wood with edges of 12 x 5 x 0.9 cm. with the fibers running in the direction of the largest dimension was dried in a vacuum oven at a temperature of 50° C. and a pressure of 5 mm. Hg until the weight remained constant. The dried wood was evacuated in a desiccator at 0.5 mm. Hg at room temperature for 2 hours. Then a mixture of monomers was added which consisted of 85% (by weight) of vinyl acetate and 15% (by weight) of a vinyl ester of a strongly branched carboxylic acid with 9–11 carbon atoms (hereinafter monomer mixture A)

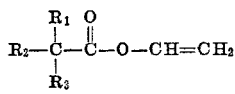

$R_1$, $R_2$, $R_3$ are straight-chain alkyl groups, and at least one of the substituents is a methyl group (which can be obtained commercially under the registered trademark "VeoVa" 911 from the Shell Chemical Company). This was done by immersing the wood completely into the mixture of monomers. It was left standing for 24 hours under atmospheric pressure, which resulted in the absorption of 110% by weight of the mixture of monomers. After this preparation the wood was wrapped in aluminum foil. After rinsing with nitrogen that had been freed of all oxygen the wood was placed into a plastic bag and irradiated with the gamma-radiation of a cobalt-60 radiation source with a radiation intensity of 0.85 megarad/hour at a temperature of 20° C. The total radiation dose was 1.0 megarad. No noticeable shrinkage was observed during the polymerization. After the irradiation the wood specimens were dried at a temperature of 50° C. and a pressure of 5 mm. Hg until the weight remained constant. It was found that 99% of the monomers had reacted and the weight of the polymers was 109% of the weight of the wood.

A few of the wood specimens were then immeresd in water at 20° C. for 24 hours. After this treatment, a weight increase of 5% was observed. In the untreated wood specimens (blind test) the increase in weight after a 24 hour immersion in water was 30%. The increase in thickness after immersion in water at 20° C. for 24 hours was less for the treated wood than for the untreated wood. It was 1.5% compared to 2.6%.

Other wood specimens were stored in a controlled-atmosphere room for 25 days at 30° C. and 95% relative humidity. After this treatment an increase in weight of 11% was observed while untreated specimens showed an increase in weight of 22%. After 25 days the weights remained constant.

The abrasion testing of the wood specimens perpendicularly to the fiber direction was done, according to NEMA LD 1–2.01 with a Taber Abrasion Tester. (Holding device, sand paper band S 33, hard rubber rolls 2×500 g. load accurately of scale 0.01 g.) In these tests the loss of weight after 300 cycles was measured, and the 1000-cycle value was computed.

An abrasion loss of 0.54 g./1000 cycles was found. In similarly tested specimens made with pure methyl methacrylate (comparative specimen), an abrasion loss of 0.84 g./1000 cycles was found and for untreated wood specimens a loss of 1.35 g./1000 cycles.

The Brinell hardness of the wood specimens perpendicularly to the direction of the fibers was determined in accordance with DIN 7708 with a ball diameter of 10 mm. and a pressure of 100 kg. during 60 seconds. A Brinell hardness of 6.1 kg./cm.² was observed, compared to a Brinell hardness of 1.3 kg./mm.² for untreated wood specimens.

Example 2

Okoume wood with edge dimensions of 12 cm. x 5 cm. x 1.4 mm. was, as described in Example 1, dried, evacuated, and impregnated within the identical mixture of monomers (A). 80% of the monomers were absorbed. The wood specimens prepared in this manner were wrapped in aluminum foil and irradiated with electrons with an average energy of 400 kev, and intensity of 3 megarad/sec. and an irradiation dose of 12 megarad, at room temperature. (The specimens were irradiated on both sides.)

After irradiation the wood specimens were dried until the weight remained constant, as described in Example 1. 98% of the monomers reacted and the weight of the polymers, relative to the weight of the wood, was 79%. Several of the specimens were then immersed in water for 24 hours at 20° C. An increase in weight of 30% was observed, while the increase for untreated wood specimens was 105%.

Another portion of the specimens was stored in a controlled-humidity room at 30° C. and 95% relative humidity for 25 days. The increase in weight was 12%. For untreated wood specimens the increase in weight was 26%. The increase in width was 3.5% for the treated specimens and 5.5% for the untreated specimens.

Example 3

Okoume wood with edge dimensions of 12 cm. x 5 cm. x 0.9 cm. was, as described in Example 1, dried, evacuated and impregnated with the identical mixture of monomers (A) with 1.0% benzoyl peroxide added. The wood prepared in this manner was then wrapped as in Examle 1 and treated for 24 hours at 60° C. in an oven. After polymerization the wood specimens were dried until the weight remained constant, as described in Example 1. 95 of the monomer reacted and the weight of the polymer, in relation to the weight of the wood, was 110%.

The wood specimens were then treated as described in Example 1. An increase in weight of 7%, and of the thickness of 1.4% was observed after immersion in water for 24 hours at 20° C. After storing in a controlled-humidity room for 25 days at 30° C. and 95% relative humidity, the increase in weight was 11%. The abrasion loss was 0.52 g./1000 cycles and the Brinell hardness was 6.0 kg./mm.².

Example 4

In order to obtain a comparison with Example 1, a piece of okoume wood that had been impregnated with pure methyl methacrylate was irradiated with an intensity of 0.85 megarad/hour and a dose of 2.25 megarad. The wood did not shrink during polymerization; 99% the monomer reacted and the weight of the polymer was 118% of the weight of the wood.

The abrasion test of the wood was made in the same manner as described in Example 1. The abrasion resistance of wood treated with methyl methacrylate was smaller than that of wood treated with monomer mixture (A). The abrasion loss was 0.84 g./1000 cycles.

Example 5

Okoume wood with edge dimensions of 12 cm. x 5 cm. x 0.9 cm. was dried as described in Example 1. The dried wood was evacuated during 2 hours at 0.5 mm. Hg in a metal autoclave. Afterwards a monomer mixture was added consisting of 70% (by weight) vinyl acetate and 30% (by weight) of strongly branched carboxylic acid with 10 carbon atoms.

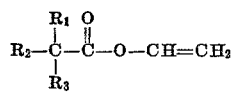

where $R_1$, $R_2$ and $R_3$ are straight-chain alkyl groups and at least one of the substituents is a methyl group (which can be obtained commercially from Shell Chemical Company under the registered trademark "VeoVa" 10). This was done by completely immersing the wood in the monomer mixture. It remained immersed during 24 hours under 10 atmospheres excess pressure, which caused the absorption of 101% by weight of monomer mixture. The wood prepared in this manner was wrapped and irradiated as described in Example 1. (Radiation intensity 0.85 megarad/hour, irradiation dose 1 megarad). Practically no shrinkage was observed during polymerization. After irradiation the wood specimens were dried, as described in Example 1, until the weight remained constant. 99% of the monomers reacted and the weight of the polymer was 100% of the weight of the wood.

The wood specimens were then treated in the same manner as described in Example 1. After immersion in water for 24 hours at 20° C. an increase in weight of 4.5% was observed and the thickness increased by 1.5%. After storage for 25 hours in a controlled-humidity room at 30° C. and 95% relative humidity an increase in weight of 5% was observed. The abrasion loss was 0.53 g./1000 cycles and the Brinell hardness 8.0 kg./mm.$^2$.

Example 6

Okoume wood with edge dimensions of 12 cm. x 5 cm. x 0.9 cm. was dried and evacuated as described in Example 5, and impregnated with a monomer mixture containing 85% by weight vinyl acetate and 15% by weight vinyl ester of a strongly branched carboxylic acid with 10 carbon atoms (VeoVa 10 as described in Example 5, hereinafter monomer mixture B). During the impregnation process 110% of monomer was absorbed. The wood prepared in this manner was wrapped as described in Example 1 and irradiated. (Intensity of radiation 0.85 megarad/ hour, irradiation dose 1.0 megarad). Practically no shrinking was observed during the polymerization process. After polymerization the wood specimens were dried, as described in Example 1, until the weight remained constant. 99% of the monomers reacted and the weight of the polymer was 109% of the weight of the wood.

The wood specimens were then treated as described in Example 1. After immersion in water during 24 hours at 20° C. the increase in weight was 4% and the thickness increased 1.4%. After storage for 25 days in a humidity-controlled room at 30° C. and 95% relative humidity, the increase in weight was 5%. The abrasion loss was 0.50 g./1000 cycles and the Brinell hardness was 6.0 kg./mm.$^2$.

Example 7

Okoume wood with edge dimensions of 12 cm. x 5 cm. x 0.9 cm. was, as described in Example 5, dried, evacuated, and impregnated with monomer mixture B. During the impregnation process 117% by weight of the monomer mixture was absorbed.

The specimen prepared in this manner was wrapped as in Example 1 and irradiated with the gamma radiation of a cobalt-60 radiation source with an irradiation intensity of 105 kilorad/hour and with an irradiation dose of 0.8 megarad, at 20° C. Practically no shrinking was observed during polymerization. After polymerization the wood specimens were dried, as described in Example 1, until the weight remained constant. 98% of the monomers reacted and the weight of the polymers was 115% of the weight of the wood.

The wood specimens were treated as in Example 1. After immersion in water for 24 hours at 20° C. an increase in weight of 8% was observed, and the thickness increased by 1.5%. After storage in a humidity-controlled room for 25 days at 30° C. and 95% relative humidity the increase in weight was 6%. The abrasion loss was 0.43 g./1000 cycles and the Brinell hardness was 5.7 kg./mm.$^2$.

Example 8

Okoume wood with edge dimensions of 12 cm. x 5 cm. x 0.9 cm. was dried and evacuated as described in Example 5 and impregnated with a monomer mixture of 85% by weight vinyl propionate and 15% by weight vinyl ester of strongly branched carboxylic acids with 9–11 carbon atoms (VeoVa 911—as described in Example 1). 150% by weight of monomer mixture was absorbed during the impregnation process. The wood prepared in this manner was wrapped as described in Example 1 and irradiated with an irradiation intensity of 0.85 megarad/hour and an irradiation dose of 1.5 megarad. During the polymerization the wood did not show any shrinkage. With this dose, 99% of the monomers reacted and the weight of the polymer was 148% of the weight of the wood.

The wood specimens were treated in the same manner as described in Example 1. After immersion in water during 24 hours at 20° C. the weight increased 5% and the increase in thickness was 1.9%. After storage for 25 days at 30° C. and 95% relative humidity a weight increase of 7% was observed. The abrasion loss was 0.35 g./1000 cycles and the Brinell hardness was 4.0 kg./mm.$^2$.

Example 9

Okoume wood with edge dimensions of 12 cm. x 5 cm. x 1.4 mm. was dried as described in Example 1. The dried wood was clamped between two aluminum plates (14 cm. x 8 cm. x 1 cm.). A thin plastic film (polyethyleneterephthalate, 100 microns) was used to separate each piece of veneer from the next one. The dried, clamped wood was evacuated for 2 hours at 0.5 mm. Hg at room temperature in an autoclave made of metal. Then the monomer mixture B was added by immersing the wood completely in the mixture. The wood was left immersed for 24 hours under 10 atmospheres excess pressure and 134% monomer mixture was absorbed. The wood which had been prepared in this manner was then, still clamped, wrapped in aluminum foil. After rinsing with oxygen-free nitrogen the wrapped wood was placed in a plastic bag and irradiated with the gama-radiation of a cobalt-60 source. The irradiation intensity was 0.8 megarad/hour, the irradiation dose was 1.0 megarad and the temperature 20° C. No shrinking was observed during the polymerization. After irradiation the wood specimens were dried at a temperature of 50° C. and a pressure of 5 mm. Hg until the weight remained constant, and then they were weighed. 99% of the monomers reacted and the weight of the polymer was 133% of the weight of the wood. By means of this method thin layers of a smooth, flat, wood-based product were made.

A number of these wood specimens were then immersed in water for 24 hours at 20° C. After the immersion an increase in weight of 30% was obterved while the increase in weight for untreated wood specimens was 110%. The abrasion resistance test of the wood specimens was made as described in Example 1. The abrasion loss was 0.53 g./1000 cycles. For the untreated wood specimens the abrasion loss was 0.87 g./ 1000 cycles.

Example 10

Red-oak wood with edge dimensions of 12 cm. x 2.4 cm. x 0.8 cm. was dried and evacuated, and impregnated with the monomer mixture B, as described in Example 5. 66% by weight of monomer mixture was absorbed. The wood prepared in this manner was wrapped as in Example 1 and irradiated with an intensity of 0.8 magarad/hour and with a dose of 2.0 megarad. The wood did not show any shrinkage. After polymerization the wood specimens were dried until the weight remained constant, as described in Example 1. 98% of the monomer reacted and the weight of the polymer was 65% of the weight of the wood.

Abrasion-resistance and Brinell-hardness tests were made, as described in Example 1. The abrasion was found to be 0.66 g./1000 cycles. The Brinell hardness was 9.2 kg./mm.$^2$. The Brinell hardness of untreated wood specimens was 3.2 kg./mm.², the abrasion loss was 0.83 g./1000 cycles.

A number of the wood specimens were stored for 20 days in a humidity-controlled room at 20° C. and 83% relative humidity. The increase in weight was 8%; untreated wood specimens had an increase in weight of 14%. After 20 days the values remained constant.

Example 11

Beech wood with edge dimensions of 12 cm. x 2.4 cm. x 0.8 cm. was dried, evacuated, and impregnated with monomer mixture B as described in Example 5. 75% by weight of monomer mixture was absorbed. The wood prepared in this manner was wrapped as in Example 1 and irradiated with an intensity of 0.85 magarad/hour and a total dose of 2.0 megarad. The wood did not show any shrinkage. 96% of the monomer reacted and the weight of the polymer was 72% of the weight of the wood.

The wood specimens were stored for 20 days in a humidity-controlled room at 20° C. and 83% relative humidity. The increase in weight was 7% while untreated wood specimens showed a weight increase of 14%.

Example 12

Half-hard wood-fiber panels (which are commercially obtainable from the Cham AG Paper Mills under the registered trademark "Pavatex") with a specific weight of 0.82 g./cm.³ and edge dimensions of 10 cm. x 5 cm. x 0.6 cm. were dried, evacuated, and impregnated with the monomer mixture A. 46% of monomer mixture was absorbed. The wood-fiber plates prepared in this manner were wrapped, as in Example 1, and irradiated with the gamma-radiation of a cobalt-60 source. The irradiation intensity was 0.85 megarad/hour, the dose 2.0 megarad and the temperature 20° C.

After polymerization the wood specimens were dried until the weight remained constant, as in Example 1. 97% of the monomers reacted and the weight of the polymer was 45% of the weight of the wood.

Several of the wood-fiber plates were then immersed in water for 24 hours at 20° C. This caused a weight increase of 12%. When untreated wood-fiber plates were immersed in water for 24 hours, the increase in weight was 17%. The increase in thickness after immersion in water for 24 hours at 20° C. was smaller than for untreated plates. It was 8% for treated plates and 17% for untreated plates.

The abrasion resistance test of the wood-fiber plates was conducted in accordance with NEMA LD 1-2.01 with a Tabor abrasion tester (Clamping device, sandpiper belt S 33, hard rubber roll with 2×500 g. load). In these tests the loss of weight was determined for 100 cycles.

A weight loss of 162 mg./100 cycles was found. For untreated wood-fiber plates the weight loss was 341.3 mg. for 100 cycles.

Example 13

Insulation-grade wood-fiber plates ("Pavatex," see Example 12) with a specific weight of 0.25 g./cm.³ and edge dimensions 10 cm. x 5 cm. x 1.1 cm. were dried, evacuated, and impregnated with monomer mixture A, as described in Example 1. 260% by weight of monomer mixture was absorbed. The wood-fiber plates were wrapped, irradiated, and dried as described in Example 12. 98% of the monomers reacted and the weight of the polymer was 258%.

The wood-fiber plates were treated in the same manner as described in Example 12. After immersion in water for 24 hours at 20° C. the weight increase was 7%. For untreated wood-fiber plates a weight increase of 48% was observed after immersion in water for 24 hours. The increase in thickness was 4% while the thickness of untreated wood specimens increased 14%.

Example 14

Dyed and printed impregnating paper with a thickness of 0.15 mm. and with edge dimensions of 12 cm. x 5 cm. was dried as described in Example 1. The dried paper was clamped between two aluminum plates, as in Example 9, evacuated, and impregnated with the monomer mixture B. 70% of mixture was absorbed. The paper prepared in this manner was wrapped as in Example 9 and irradiated, at 20° C., with the gamma-radiation of a cobalt-60 source. The irradiation intensity was 0.75 megarad/hour and the irradiation dose was 2.0 megarad. After polymerization the paper specimens were dried until the weight remained constant, as described in Example 1. 97% of the monomer reacted and the weight of the polymer was 68% of the weight of the paper.

Several of the paper specimens were then immersed in water for 24 hours at 20° C. The increase in weight after the immersion was 16%. After untreated paper was immersed in water for 24 hours, the increase in weight was 105%.

The abrasion test of the paper specimens was made with a Taber Abrasion Tester (Grinding Wheels CS 10, each loaded with 500 g.). In these tests the loss of weight after 100 cycles was measured.

It was found that the loss of weight was 5 mg./100 cycles. In untreated paper specimens the loss of weight was 72 mg./100 cycles.

What is claimed is:

1. A process for the manufacture of cellulose containing materials with improved abrasion resistance and improved resistance to water absorption which comprises impregnating a cellulose containing starting material with a monomer mixture containing at least one vinyl ester of an aliphatic carboxylic acid containing two or three carbon atoms together with from about 5% to 50% by weight based on the total weight of the monomer mixture at least one highly branched compound containing from about 7 to about 13 carbon atoms and represented by the formula

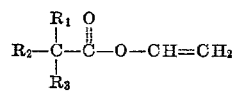

wherein $R_1$, $R_2$ and $R_3$ are straight chain alkyl groups and polymerizing resulting mixture by exposure to high intensity ionizing radiation to a total dosage of from about 0.8 to 12 megarads without decomposition of said starting material.

2. A process according to claim 1 wherein at least one of $R_1$, $R_2$ and $R_3$ is a methyl group.

3. A process according to claim 1 in which the monomer mixture contains from about 0.5 to 5% by weight of a cross linking agent based on the total weight of the monomer mixture.

4. A processs according to claim 3 in which the cross linking agent is divinylbenzene or methylene bis acrylamide.

5. A process according to claim 1 in which the monomer mixture contains from about 2 to 3% by weight of a highly polar monomer based on the total weight of the monomer mixture.

6 A process according to claim 5 in which the polar compounds is maleic acid, maleic anhydride, acrylic acid or acrylamide.

7. A process according to claim 1 in which polymerization is effected utilizing polymerization catalysts.

8. A process according to claim 1 in which the cellulose containing material is wood or wooden material.

9. A process according to claim 1 in which the cellulose containing material is paper.

10. A process for the manufacture of cellulose containing materials with improved abrasion resistance and improved resistance to water absorption which comprises impregnating a cellulose containing starting material with a monomer mixture containing at least one vinyl ester of an aliphatic carboxylic acid containing two or three carbon atoms together with from about 5% to 50% by weight based on the total weight of the monomer mixture at least one vinyl ester of highly branched carboxylic acid containing from about 7 to about 13 carbon atoms and at least one tertiary carbon atom and polymerizing resulting mixture by exposure to high intensity ionizing radiation to a total dosage of from about 0.8 to 12 megarads without decomposition of said starting material.

References Cited

UNITED STATES PATENTS

| | | | |
|---|---|---|---|
| 3,477,871 | 11/1969 | Van Wesstrenen | 117—155 |
| 3,446,767 | 5/1969 | Nolan | 117—155 X |
| 3,516,975 | 6/1970 | Meincke | 117—155 |
| 2,516,064 | 7/1950 | Marks | 260—86.1 |
| 3,215,580 | 11/1965 | Benning et al. | 117—161 X |
| 1,885,870 | 11/1932 | Snyder | 117—161 X |
| 3,247,012 | 4/1966 | Burlant | 117—93.31 |
| 3,520,714 | 7/1970 | Miller | 117—148 X |
| 2,939,270 | 6/1960 | Martin | 117—161 |
| 3,549,510 | 12/1970 | Casalina | 117—155 X |

FOREIGN PATENTS

| | | | |
|---|---|---|---|
| 622,884 | 6/1961 | Canada | 117—161 |

OTHER REFERENCES

Beall et al., Direct and RF Heat Curing of Wood-Plastic Composites, September 1966, vol. 16, No. 9, pp. 99–106.

WILLIAM D. MARTIN, Primary Examiner

S. L. CHILDS, Assistant Examiner

U.S. Cl. X.R.

117—57, 148, 155 UA, 161 UZ, 59, 60, 61